United States Patent
Bilyeu et al.

(10) Patent No.: US 7,501,461 B2
(45) Date of Patent: Mar. 10, 2009

(54) COMPOSITION OF EPOXY RESIN, ALIPHATIC AMINE CURING AGENT AND HALOGENATED AMINE

(75) Inventors: Bryan Bilyeu, Corinth, TX (US); Witold Brostow, Denton, TX (US); Kevin Menard, Denton, TX (US)

(73) Assignee: University of North Texas, Denton, TX (US)

( * ) Notice: Subject to any disclaimer, the term of this patent is extended or adjusted under 35 U.S.C. 154(b) by 532 days.

(21) Appl. No.: 11/103,947

(22) Filed: Apr. 12, 2005

(65) Prior Publication Data

US 2005/0228080 A1 Oct. 13, 2005

Related U.S. Application Data

(60) Provisional application No. 60/561,407, filed on Apr. 12, 2004.

(51) Int. Cl.
C08G 59/50 (2006.01)
C08K 7/14 (2006.01)
C08L 63/00 (2006.01)
C08L 63/02 (2006.01)
C08L 63/04 (2006.01)

(52) U.S. Cl. .................. 523/466; 525/423; 525/438; 525/504; 525/523; 528/120

(58) Field of Classification Search .................. None
See application file for complete search history.

(56) References Cited

U.S. PATENT DOCUMENTS

| | | | |
|---|---|---|---|
| 2,324,483 A | 2/1943 | Castan | |
| 2,456,408 A | 12/1948 | Greenlee | |
| 3,267,145 A | 8/1966 | Lund et al. | |
| 3,359,216 A | 12/1967 | Szobel et al. | |
| 3,931,058 A | 1/1976 | Batzer et al. | |
| 4,069,204 A * | 1/1978 | Susman | 528/124 |
| 4,978,791 A * | 12/1990 | Volker et al. | 564/335 |
| 5,075,378 A * | 12/1991 | Smierciak et al. | 525/109 |
| 6,674,016 B2 * | 1/2004 | Kubo et al. | 174/260 |

FOREIGN PATENT DOCUMENTS

| | | |
|---|---|---|
| CH | 211116 | 11/1940 |
| DE | 749512 | 11/1944 |
| EP | 1293549 | 3/2003 |
| GB | 518057 | 2/1940 |
| GB | 1246901 | 9/1971 |
| JP | 2-164857 A * | 6/1990 |
| JP | 2002-60594 A * | 2/2002 |
| SU | 802314 B * | 2/1981 |
| SU | 1115919 A * | 9/1984 |

OTHER PUBLICATIONS

HCAPLUS accession No. 1992:449367 for the Johncock et al. article in Polymer, 1992, vol. 33, No. 11, abstract, one page.*

Chambon, F., and Winter, H.H. Linear Viscoelasticity at the Gel Point of a Crosslinking PDMS with Imbalanced Stoichiometry. J Rheol 31:683-697, (1987).
Gillham, J.K. "A Semimicro Thermomechanical Technique for Characterizing Polymeric Materials: Torsional Braid Analysis." AIChE J., 20 (1974) 1066-1079.
Griffith, J.R. and Romans, J.B. "A Comparison of the Triboelectric Charging of Poly (Tetrafluoroethylene) and an Amine-Cured Fluoroepoxy Resin." J. Fluorine Chem., 34 (1987) 361-364.
Hadad, D.K. and May, C.A. Engineered Materials Handbook, vol. 2, Engineering Plastics, Sec. 5, Ed. C.A. Dostal, ASM International, Metals Park, Ohio (1988) 521.
Winter, H.H. and Chambon, F. "Analysis of Linear Viscoelasticity of a Crosslinking Polymer at the Gel Point." J Rheology 30:367-382 (1986).
Bilyeu, B "Characterization of Cure Kinetics and Physical Properties of High Performance, Glass Fiber-Reinforced Epoxy Prepreg and a Novel Fluorine-Modified, Amine-Cured Commercial Eposy" Dissertation, Dec. 2003, University of North Texas, Denton Texas.
PCT International Search Report and Written Opinion Dated Jul. 15, 2005.
Brostow, W., P.E. Cassidy, H.E. Hagg, M. Jaklewicz and P.E. Montemartini, "Fluoropolymer Addition to an Epoxy: Phase Inversion and Tribological Properties", Polymer 42, 2001, 7971.
Brostow, W., B. Bujard, P. Cassidy, H. Hagg and P.E. Montemartini, Effects of fluoropolymer addition to an epoxy on scratch depth and recover, Mat. Res. Innov., 6: 7-12, (2002).
Chambon, F., Petrovic ZS, MacKnight WJ, Winter HH Rheology of Model Polyurethanes at the Gel Point. Macromolecules 19:2146-2149, (1986).
Cassettari, M., G. Salvetti, E. Tombari, S. Veronesi, and G.P. Johari: "Calorimetric Determination of Vitrification Time and Heat Capacity of a Thermosetting Polymer". J. Polym. Sci.: Part B: Polym. Phys. 31, 199-208, (1993).
DOW Plastics, Product Information D.E.R. 330 Liquid Epoxy Resin, Dow Chemical Company, Midland, Michigan, Publication Form No. 296-01457-1001XSI.
DOW Plastics, Product Information D.E.R. 332 Liquid Epoxy Resin, Dow Chemical Company, Midland, Michigan, Publication Form No. 296-01447-1001XSI.

(Continued)

*Primary Examiner*—Robert Sellers
(74) *Attorney, Agent, or Firm*—Jackson Walker L.L.P.

(57) ABSTRACT

One aspect of the current invention is a halogen containing epoxy composition and a method of producing the same. A functional halogen group, fluorine in one case, is incorporated into an epoxy coating by using a functionalized amine curing agent in small amounts. Functionalized amine curing agents are cheaper and easier to produce from small amine precursors when compared to the cost and complexity of functionalizing bulky epoxy resins. Amine curing agents are incorporated into a cured epoxy network. However, many functional groups will affect the reactivity of the curing reaction due to electronegativity effects. By using small amounts of functionalized amines with a large amount of non-functionalized agent, the effect is small and in the case of migration, it can be advantageous for tribological, mechanical and other properties of epoxies and epoxy-containing materials. Additionally, in stratified coatings, it is advantageous to use smaller functionalized amine molecules that can migrate more quickly into the composition before the composition becomes fully cured.

4 Claims, 13 Drawing Sheets

OTHER PUBLICATIONS

DOW Plastics, Product Information D.E.N. 425 Liquid Epoxy Resin, Dow Chemical Company, , Midland, Michigan, Publication Form No. 296-01649-0404-TD.

DOW Plastics, Product Information D.E.N. 431 Liquid Epoxy Resin, Dow Chemical Company, , Midland, Michigan, Publication Form No. 296-01442-1203-TD.

DOW Plastics, Product Information D.E.R. 732 Liquid Epoxy Resin, Dow Chemical Company, , Midland, Michigan, Publication Form No. 296-01474-1001XSI.

DOW Plastics, Product Information D.E.R. 736 Liquid Epoxy Resin, Dow Chemical Company, Midland, Michigan, Publication Form No. 296-01507-1001XSI.

Hatakeyama, T. and H. Hatakeyama, Effect of chemical structure of amorphous polymers on heat capacity difference at glass transition temperature, Thermochim. Acta, 267 (1995) 249.

Matuszczak, S. and W.J. Feast, An approach to fluorinated surface coatings via photoinitiated cationic cross-linking of mixed epoxy and fluoroepoxy systems, J. Fluorine Chem., 102 (2000) 269.

O'Neill, M.J., The Analysis of a Temperature-Controlled Scanning Calorimeter, Anal. Chem., 36 (1964) 1238.

Watson, E.S., M.J. O'Neill, J. Justin and N. Brenner, A Differential Scanning Calorimeter for Quantitative Differential Thermal Analysis, Anal. Chem., 36 (1964) 1233.

DOW Plastics, Product Information D.E.R. 354 Liquid Epoxy Resin, Dow Chemical Company, Midland, Michigan, Publication Form No. 296-01451-0203X TD.

* cited by examiner

A difunctional aliphatic amine curing agent.

COMPOSITION OF EPOXY RESIN, ALIPHATIC AMINE CURING AGENT AND HALOGENATED AMINE

RELATED APPLICATIONS

This application claims priority to U.S. Provisional Patent Application Ser. No. 60/561,407, entitled "Characterization of Cure Kinetics and Physical Properties of a High Performance, Glass Fiber Reinforced Epoxy Prepreg and a Novel Fluorine-Modified, Amine-Cured Commercial Epoxy" filed on Apr. 12, 2004, having Bilyeu et al., listed as the inventors, the entire content of which is hereby incorporated by reference.

BACKGROUND

The present invention pertains to halogen-containing cured or self-cured compositions and their methods of preparation. More specifically, a halogen-containing epoxy compositions can be formed by mixing an epoxy resin, an amine curing agent and a halogenated amine. The resultant halogen-containing compositions have improved tribological properties, namely reduction of friction and wear.

Epoxy resins represent an important class of polymers primarily due to their versatility. High degree of crosslinking and the nature of the interchain bonds give cured epoxies many desirable characteristics. These characteristics include excellent adhesion to many substrates, high strength, chemical resistance, fatigue resistance, corrosion resistance and electrical resistance. In addition, processing is simplified by the low shrinkage and lack of volatile by-products. Properties of the cured epoxies such as mechanical strength or electrical resistance can be optimized by appropriate selection of the epoxy monomer and the curing agent or catalyst. Because of the ease of application and desirable properties, epoxies are widely used for coatings, corrosion protectants, electronic encapsulants, fiber optic sheathing, flooring and adhesives.

Epoxy compounds were first synthesized as early as 1891; however, commercialization did not come about for the next 50 years. Two independent researchers, developing separate applications, synthesized the first commercial epoxy resins. Pierre Castan of de Trey Frères in Switzerland, while developing dental restoration materials, discovered the reaction of diglycidylether of bisphenol-A (DGEBA) with pthalic anhydride. The patents were assigned to Ciba A G of Basel, Switzerland (now Ciba-Geigy) in 1942. At the same time, Sylvan Greenlee at DeVoe and Raynolds (later Celanese Chemical Company, and subsequently Hoechst-Celanese) in America, while developing surface coatings, discovered another DGEBA resin, which differed only in molecular weight. Greenlee's first of many patents was granted in 1948. These DGEBA resins and subsequent derivatives have, and continue to be, the largest product in the epoxy market, primarily in the surface coatings industry for which it was developed. The characteristics which Greenlee and Castan sought and found in DGEBA, including adhesion, hardness, inertness and thermal resistance, are responsible for its popularity. Many other monomers and polymers have been subsequently epoxidized to increase the desirable properties of DGEBA and to develop special properties such as high electrical resistance and thermal stability.

Epoxies are characterized by the presence of one or more epoxide functional groups on or in the polymer chain. The epoxide group is planar, with a three-membered ring composed of one oxygen and two carbon atoms. Due to the high ring strain, similar to that in cyclopropane, the group is very reactive.

The ring-opening polymerization and crosslinking in epoxy resins can be of two general types, catalyzed homopolymerization or bridging reactions which incorporate a coreactive crosslinking agent into the network. Homopolymerization, or reactions between epoxy chains, involve elimination reactions on the oxygen atom of the epoxide group using acid or base catalysts, often activated by radiation. The incorporation, or bridging reaction, involves nucleophilic attack on one of the epoxide carbons by an amine or an anhydride compound. An obvious and important difference in the result of the two different curing methods is that in homopolymerization the network is only composed of the cross-linked epoxy monomers, whereas in the bridging reaction the network is composed of a copolymer of both epoxy monomers and a curing agent. Therefore in a bridging reaction the network properties are a function of two components, which allows modifications to be incorporated in either component.

Epoxies and curing agents have been chemically modified for a variety of special purposes, with recent attention given to the addition of fluorine functional groups to increase electrical resistance and dielectric constant as well as for improved tribological properties, namely reduction of friction and wear. While significant work has been done in fluorinating epoxy resins or epoxidizing fluoropolymers, the costs are typically prohibitively high. Researchers continue to develop economically viable epoxy with the friction-reducing fluoro groups bonded into a wear-resistant epoxy network. A preferred embodiment of the current invention utilizes a commercially available fluorinated amine as a curing agent.

The physical properties of uncured epoxy resins vary widely. As with any polymer, the viscosity of the monomers or prepolymers depend on both the molecular weight and the molecular structure. A simple example is DGEBA, as shown in FIG. 1. Higher linear molecular weight monomers, i.e. those with higher values of n, exhibit higher viscosities. In addition, molecular structure and types of bonds will greatly affect the viscosity of the resin. Since epoxies are almost always used with catalysts, crosslinking agents, accelerators and various other additives, viscosity effects like plasticization should be considered.

Epoxy curing involves two phenomena, polymerization and crosslinking. Although each phenomenon is complicated and the two are in competition during the overall curing process, generalizations and simplified models can be made. During the initial stage of curing, polymerization is favored because in the case of curing agents, primary reactions are more reactive than secondary ones. Also, the terminal epoxide reactivity already mentioned plays a role. In most cases the polymerization is an addition reaction, and thus follows a rate equation for addition polymerization described later. The molecular weight of the growing polymer increases until the molecular weight approaches infinity, so that all monomers are connected by at least one bond and a network is formed. At this point, called the gel point, the polymer possesses high molecular weight and few crosslinks, and thus behaves much like a very high molecular weight thermoplastic. From the gel point, crosslinking becomes the dominant phenomenon due to the lack of free monomers. Crosslinking involves interchain bonding of intrachain reactive sites, either intrachain epoxides or secondary sites on coreactive agents.

Although crosslinking is a different phenomenon, the rate of chemical conversion of the epoxide groups is unaffected in most epoxy systems. The crosslinking reactions produce a growing network and reduce the mobility of the chain segments. The growth of the network results in mechanical and thermal stabilization of the structure, resulting in increasing modulus and glass transition. At a certain high degree of crosslinking, the increasing molecular weight of the structure exceeds the molecular weight which is thermodynamically stable as a rubber, and the material transforms into a glass, a process called vitrification. In a glassy state, the mobility of reactants is severely restricted, reducing the rate of the reaction to a diffusion-controlled reaction, which is much slower. Further conversion is still possible, however, the rate is much slower since the process relies on diffusion rather than mobility to bring the reactants together. When the crosslinking reaction exhausts all the reactive sites available, the resulting structure is hard (high modulus) and insoluble due to a high degree of interchain bonding.

The system consists of a DGEBA epoxy, as shown in FIG. 1, is mixed with an aliphatic amine curing agent, as shown in FIG. 2. This system is similar to many of the common commercial epoxy-based adhesives in which the epoxy resin is mixed with an amine curing agent by volume. This system was characterized after mixing the two components per the manufacturer's recommendations, but was also used in a fluorination modification proceedures. Specific amounts of a fluorinated amine curing agent were substituted for some of the aliphatic amine. Previous studies conducted by W. Brostow, et al., Mat. Res. Innov., 6 (2002) 7, on thermoplastic blends with specialized components demonstrated that small amounts of fluoropolymer additives produced large effects on tribological properties of the epoxy. Therefore, small amounts of fluorinated amines were substituted. The chemical structures of the fluorinated amines used are provided in FIG. 3. The fluorination described herein provides an economically feasible method of reducing the friction on the cured epoxy surface. Most previous attempts have focused on synthetically fluorinating the epoxy chain, which is both complicated and costly.

SUMMARY

The present invention pertains to halogen-containing compositions and their methods of preparation. More specifically, a functional group, such as a halogen, is incorporated into the epoxy coating using a functionalized amine curing agent in small amounts. Functionalized amine curing agents are easier and cheaper to produce from small amine precursors when compared to the production of functionalized bulky epoxy resins. In the current invention, functionalized amine curing agents are incorporated into a cured epoxy network. Since smaller amines will migrate faster than larger amines, the migration of functionalized molecules before the composition is cured can be advantageous in stratified coatings. Many functional groups can affect the reactivity of the curing reaction due to electronegativity effects. However, by using small amounts of functionalized amines with a large amount of non-functionalized agent, the electronegativity effect can be minimized.

One aspect of the current invention is a halogen-containing cured or self-cured epoxy composition that is made from at least three components. The three components are an epoxy resin; an aliphatic amine curing agent; and a halogenated amine. The pre-cured volume ratio of the halogen-containing epoxy composition is about 2 parts of the epoxy resin to about 1 part of a combined volume of: the aliphatic amine curing agent and the halogenated amine. Additionally, the combined volume of the aliphatic amine curing agent and the halogenated amine is about 1% to about 25% volume the halogenated amine.

In a preferred embodiment, the epoxy resin is selected from the following: a diglycidylether of bisphenol-A ("DGEBA") epoxy resin; a diglycidylether of bisphenol-F ("DGEBF") epoxy resin; an epoxy novolac resin, or an epoxy glycol resin. However, it will be understood that the specific epoxy resins given as examples have been chosen for purposes of illustration only and not be construed as limiting the invention. Also illustrative is the aliphatic amine curing agent that can be utilized. For example, aliphatic amine curing agents such as: $H_2N—[CH_2]_n—NH_2$, and n as an integer having a value of 1 to 10; polymethylene diamine; aniline, phenylamine; 4,4'-diaminodiphenylsulfone; or $H_2N—[—(CH_2)_n\,NH—]_{n'}—(CH_2)_{n'''}—NH_2$ polyamine, and n', n'' and n''' are the same or different and are integers having a value of 1-10, which are suitable for use in the current invention. Additionally, examples of some of the fluorinated amines useful for this invention are as follows: 4-fluroaniline; 2,6-difluoroaniline; 3,4-difluoroaniline; 3,5-bis(trifluoromethyl)aniline; or 3-aminobenzotrifluoride. Some fluorinated amines (e.g. 2-fluoraniline; 3,5-difluoraniline; or 3-fluoraniline) can reduced wear rate of the cured epoxy. Reinforcement fibers (e.g. glass, carbon, or ceramic) can also be used in the fluorine containing epoxy composition.

A second aspect of the current invention is a method of making a fluorine containing epoxy compositions. The method mixes an epoxy resin, an aliphatic amine curing agent and a fluorinated amine together in a volume ratio of about 2:1. Thus, the pre-cure volume ratio uses about 2 parts of the epoxy resin and mixes it with about 1 part of a combined volume of the aliphatic amine curing agent and the fluorinated amine. Furthermore, the fluorinated amine comprises about 1% to about 25% volume of the combined mixed volume of the aliphatic amine curing agent and the fluorinated amine. Preferred epoxy resins such as diglycidylether of bisphenol-A ("DGEBA"), diglycidylether of bisphenol-F ("DGEBF"), epoxy novolac resin, or an epoxy glycol resin were noted above. Additionally, preferred aliphatic amine curing agents and preferred fluorinated amines are used as non-limiting examples (e.g. $H_2N—[CH_2]_n—NH_2$, and n is an integer having a value of 1 to 10; polymethylene diamine; aniline, phenylamine; 4,4'-diaminodiphenylsulfone; or $H_2N—[—(CH_2)_n\,NH—]_{n'}—(CH_2)_{n'''}—NH_2$ polyamine and n', n'' and n''' are the same or different and are integers having a value of 1 to 10; 4-fluroaniline; 2,6-difluoroaniline; 3,4-difluoroaniline; 3,5-bis(trifluoromethyl)aniline; or 3-aminobenzotrifluoride; 2-fluoraniline; 3,5-difluoraniline; or 3-fluoraniline).

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF PREFERRED EMBODIMENTS

Figure 1:
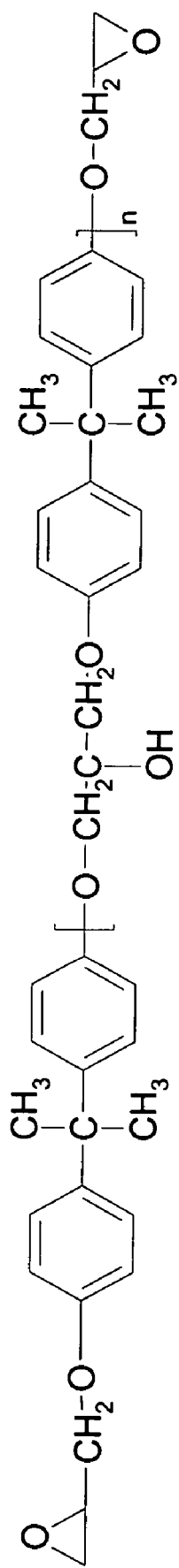
FIG. 1 shows Diglycidylether of Bisphenol-A (DGEBA)
Figure 2:
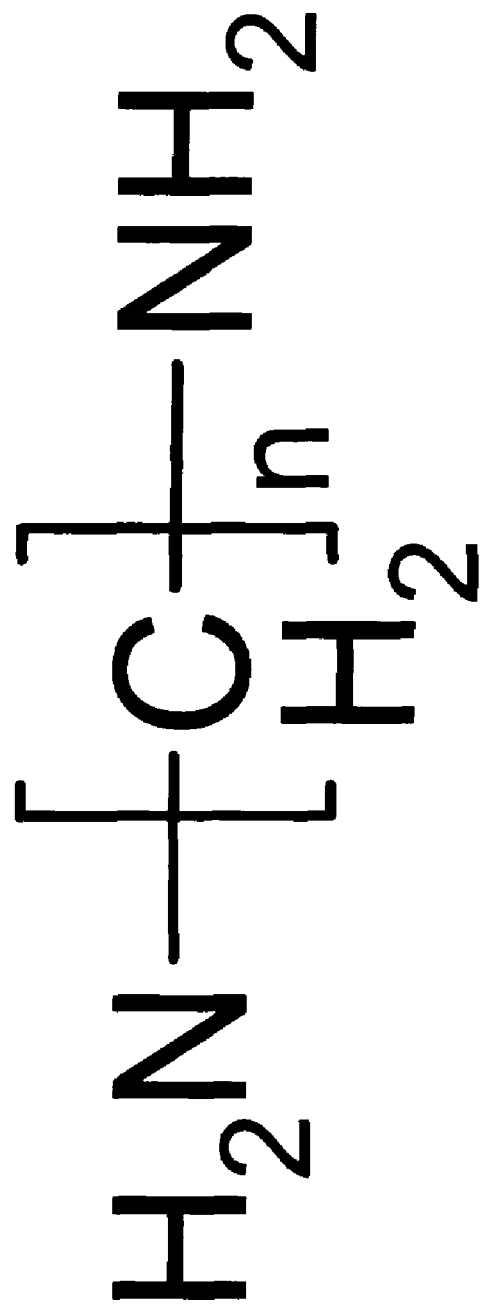
FIG. 2 shows a difunctional aliphatic amine curing agent.
Figure 3:
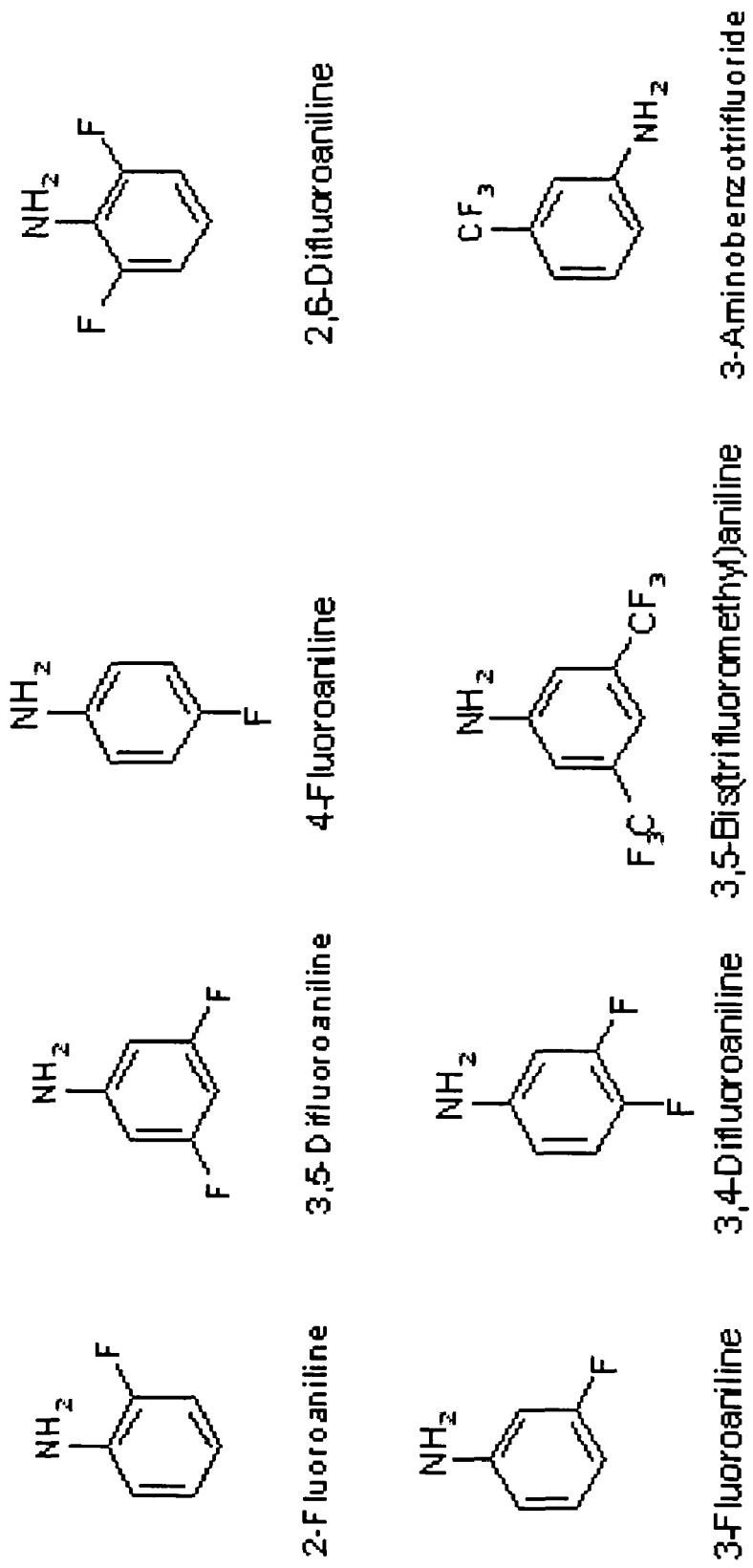
FIG. 3 shows chemical structures of the eight fluorinated amines used with the aliphatic amine to cure the DGEBA epoxy.

The addition of chemically modified halogen functional groups to epoxies and curing agents have been used to increase electrical resistance and dielectric constant as well as for improved mechanical properties, namely reduction of friction and wear. However, the costs of halogenating epoxy resins or epoxidizing halopolymers are typically prohibitively high. In a preferred embodiment, an economically viable epoxy having friction-reducing fluoro groups bonded into a wear-resistant epoxy network was achieved using a commercially available fluorinated amine curing agent. The compositions and methods are described below.

A commercial epoxy system manufactured by System3 was utilized as the example epoxy system. The System3 system is a DGEBA epoxy resin having a separate aliphatic amine. An epoxy composition is formed when the System3 epoxy resin is mixed with the curing agent. In a preferred embodiment for making a halogen-containing epoxy, the System 3 epoxy resin was combined with a mixture of aliphatic amine and various halogenated amines, including: 2-fluoroaniline; 3-fluoroaniline; 4-fluoroaniline; 3,5-difluoroaniline; 3,4-difluoroaniline; 2,6-difluoroaniline; 3-aminobenzotrifluoride; and 3,5-bis(trifluoromethyl)aniline. The halogenated amines were obtained from Fluorochem USA (West Columbia, S.C.).

I Reaction Rates, Molecular Weight, Segment Mobility and Crosslink Density of Fluorine-Containing Compositions:

Due to the high potential energy of the ring-strained epoxide groups in the uncured resin, there is a large Gibbs function difference associated with the ring-opening reaction. Since the Gibbs function change ($\Delta G$) is expressed in the form of both enthalpic ($\Delta H$) and entropic ($\Delta S$) changes, the reaction is called exergenic. Although structural changes will result in a significant entropy change, the enthalpy change is the dominant effect. The change in enthalpy results in the evolution of thermal energy or heat, making this an exothermic reaction. Since the opening of the epoxide rings have much higher energy (and enthalpy) differences than the other reactions, the amount of heat evolved and the rate of evolution will correspond to the number of epoxide groups reacting and the rate of the reaction. The current standard technique for quantitative evaluation is the measurement of the change in enthalpy using Differential Scanning Calorimetry ("DSC"), since the heat flow during a constant pressure reaction is defined as the change in enthalpy of the system.

The power-compensation DSC, employs separate heating elements and thermocouples for sample and reference, applying separate currents to the heaters to maintain a null difference in the temperature. DSC instruments generate plots of heat flow as a function of the programmed temperature. The power-compensation DSC maintains the programmed temperature ramp in both sample and reference, ensuring temperature control in the sample. This is important in temperature sensitive reactions, including thermoset curing. To determine the extent of a curing reaction or the degree of cure, $\alpha$, the change in enthalpy is compared to the total change in enthalpy of the complete reaction. Generally the total change in enthalpy is determined using a slow temperature ramp from a low temperature to a temperature just below the onset of thermal degradation. The reaction enthalpic changes are measured during isothermal measurements. The rate of the curing reaction can be determined from the isothermal data used to determine the degree of cure. Since the enthalpy change is plotted as a function of time, the rate of change in time, dH/dt will represent the rate of the reaction.

Epoxy curing involves an increase in both linear molecular weight and crosslink density, both of which result in reduced chain segment mobility. Increasing the linear molecular weight or crosslink density of a polymer chain increases the position of the glass transition temperature, $T_g$. Many thermosetting polymer systems exhibit a relationship between the $T_g$ and the degree of chemical conversion. Most epoxy-amine systems exhibit a linear relationship, which implies that the change in molecular structure with conversion is independent of the cure temperature. Such a $T_g$ shift, in many circumstances, gives better resolution of cure state than enthalpy changes, especially at high and low degrees of cure. The $T_g$ can be measured by a variety of techniques, each with certain advantages and disadvantages depending on the material and conditions. The $T_g$ also directly affects the ability of functional groups to migrate, such as the migration of the fluorine groups on the amines to the surface in this study.

The most convenient, and generally most accurate, method for determining the $T_g$ of polymers is DSC. The $T_g$ is taken as the temperature at the inflection point (peak of derivative curve) of the baseline shift in heat flow, or as the temperature at the half height shift in baseline heat flow. The shift in baseline heat flow associated with the glass transition is a result of the difference in heat capacity between the rubber and the glass. Since this shift is an effect of the heat capacity change, resolution of the glass transition can be increased by calculating and plotting the constant pressure heat capacity, $C_p$. The $C_p$ curve is calculated by comparing the heat flow (or differential power supplied), a baseline, and a reference material, usually sapphire, as described in an ASTM standard.

In preferred embodiments, DSC measurements were performed on a Perkin-Elmer Pyris-1 operating on a Windows NT platform using liquid nitrogen as the coolant and helium (20 ml/min) as the purge gas on resin samples of 5 to 10 mg in crimped aluminum pans. Isothermal measurements were performed at 10 K intervals between 120 and 180° C. holding for an appropriate time (100 to 500 minutes). Temperature scans were performed from subambient (−100° C.) to 300° C. at 10 K/min. The Pyris-1 was burned out and calibrated for temperature with both indium and zinc standards and for enthalpy with the heat of fusion of indium at the beginning and monthly during the project. The sensitivity of the Pyris-1 is 35

μW with calorimetric precision of 0.1%. The temperature accuracy and precision is 0.1° C.

High heating rate DSC experiments were performed on a Perkin-Elmer Diamond DSC operating on a Windows 2000 platform using liquid nitrogen as the coolant and helium (20 ml/min) as the purge gas on resin samples of 5 to 10 mg in crimped aluminum pans. Temperature scans were performed from subambient (−100° C.) to 300° C. at rates up to 500 K/min. The Diamond DSC was burned out and calibrated for temperature with both indium and zinc standards and for enthalpy with the heat of fusion of indium at the beginning and monthly during the project. The sensitivity of the Diamond DSC is 35 μW with calorimetric precision of 0.1%. The temperature accuracy and precision is 0.1° C.

II Mechanical Behavior of Epoxies

Epoxies undergo changes in mechanical behavior as a function of cure. In addition to the shift in $T_g$, there are changes in the viscoelastic behavior due to both polymerization and crosslinking. The $T_g$ can be measured accurately using dynamic mechanical analysis (DMA). The $T_g$ in DMA measurement is generally taken as the peak in tan δ. There is also a frequency dependence to the DMA signals. This frequency dependence is due to the viscoelastic nature of the polymer and can be used to determine the activation energy of the transition, namely how much energy is required to make the transition.

Gelation refers to the point during the curing reaction where the molecular weight approaches the maximum, usually assumed to be infinite, meaning that all monomers are connected to the network by at least one chemical bond. While gelation is a microscopic effect, it produces macroscopic effects. Microscopic gelation refers to the definition of the gelation phenomenon, i.e. all monomers connected by at least one bond to the network. Since it occurs at a defined point in polymerization, it will occur at a specific degree of conversion.

Microscopic gelation is difficult to measure since the measurable properties would be solubility and molecular weight. However, the consequence of exceeding the microscopic gel point, is macroscopic gelation, which is much easier to measure. The macroscopic gel point is a mechanical property and can be identified by common thermal analysis techniques, including in-situ testing. Beyond gelation, there is no increase in molecular weight, only an increase in crosslink density and a decrease in free chain segment length. Gelation also represents the end of functional group migration.

Gelation does not significantly affect the chemical conversion or curing reaction, so it does not appear in DSC measurements. However, it does have a large influence on the mechanical properties of the polymer. Gelation affects the stiffness (modulus), adhesion and general processability of thermosets, so it is important from an industrial processing standpoint. Gelation appears in the complex modulus, tan δ and complex viscosity of DMA measurements; however, as with many thermal events, there is no unequivocal definition at which point the gelation occurs. Gillham, who first plotted gelation curves as part of overall time-temperature-transformation (TTT) diagrams defines it as the a peak in the tan δ of a DMA isotherm, which was also adopted as an ASTM standard.

As described earlier, DMA transitions exhibit a frequency dependance. However, since gelation is an isoconversion event, it is frequency independent. The gel point is defined as the point where the tan δ becomes frequency independant. However, this method requires many measurements at different frequencies. The gel point can be defined in terms of viscosity since it represents the maximum viscosity.

Vitrification is defined as the point at which the molecular weight or cross-link density of the curing polymer exceeds that which is thermodynamically stable as a rubber, and the material undergoes a transition from a rubber to a glass at which point the reaction dramatically slows due to the reduced mobility of the reactants. The vitrification point can be measured using DSC and DMA. Although vitrification is a thermal transition from a rubber to a glass and does appear in DSC measurements, DMA continues to be the most common method. Vitrification generally occurs when the increasing $T_g$ equals the cure temperature.

DMA frequency scans were performed on a Perkin-Elmer Diamond DMA operating on a Windows 2000 platform using liquid nitrogen coolant and nitrogen (30 ml/min) purge gas on cured resin samples (2 mm×10 mm×10 mm). Temperature scans were performed from ambient to 300° C. These experiments were performed using steel flexural fixtures. The linear sensitivity of the Diamond DMA is 0.4 mm. The temperature accuracy is ±5° C.

III Tribology

Tribology, deals with the study and design of interactive surfaces in relative motion. In includes among others: friction, lubrication, scratch resistance and wear. Tribology is typically studied using materials in contact that are moved in a shear direction. Obviously, static friction would be force without motion and dynamic friction would be force producing motion. Tribological instruments typically consist of a monitored surface in the form of a skid or plate in contact with a stationary surface or object. Depending on the application, a skid in contact with a surface or a pin in contact with a movable disk may be used. A skid of the same or different material as the stationary surface may be pulled, and either the force necessary to produce initial movement or the force necessary to maintain motion is recorded. A pin on disk study typically uses a disk of the investigated material subject to rotational force while in contact with a pin of a certain geometry and material, which yields data on both friction and also wear or abrasion. Both skid and plate and pin on disk are common in tribological studies.

Sliding wear, another tribological property, is quantified by the depth of a groove resulting from multiple scratching along the same trajectory. One system uses a diamond indenter to measure the scratch depth as a function of force applied.

Tribological scratch testing was performed on a CSEM microscratch tester using CSEM software version 2.3. The indenter was a 200 micron radius diamond tipped Rockwell indenter.

EXAMPLES

The following examples are provided to further illustrate this invention and the manner in which it may be carried out. It will be understood, however, that the specific details given in the examples have been chosen for purposes of illustration only and not be construed as limiting the invention.

Example 1

Sample Preparation: The present invention pertains to halogen-containing compositions and system methods for halogenating epoxy resins. More specifically, fluorine-containing epoxy compositions were formed by mixing an epoxy resin, an amine curing agent and a fluorinated amine. The resultant fluorine-containing compositions have improved tribological properties, namely reduction of friction and wear.

DGEBA epoxy. In a preferred embodiment both control epoxies and a fluorine-containing epoxies were formed in order to compare specific properties of the cured resins. The most common epoxy resins are glycidyl ethers of alcohols or phenolics. Liquid epoxy resin is the diglycidyl ether of bisphenol A (DGEBA) and represents greater than 75% of the resin used in industrial applications, and were therefore utilized as examples of unmodified liquid epoxy resins. The example of Bisphenol A was chosen for purposes of illustration only and not to be construed as limiting the invention to only this type of resin. The epoxy resin was a general purpose Bisphenol A type resin that was nonvolatile and are appropriate for cold or heat cured systems.

The base compound or ingredient of the control composition was an epoxy resin, such as Dow D.E.R. 330 or 332, manufactured by Dow Chemical Company, Midland, Mich. The non-fluorine-containing compositions comprise about 2 parts of the epoxy resin Dow D.E.R. 330 and about 1 part aliphatic amine curing agent by volume, and the aliphatic amine curing agent was $H_2N-[CH_2]_n-NH_2$, wherein n is an integer having in a value of at least 1.

The fluorine-containing compositions substituted a fluorinated amine for part of the amine curing agent so that the total volume of commercial amine curing agent+fluorinated amine together was the same as the volume of the commercial agent alone which satisfied the 2:1 volume ratio. The ratios were varied from 1 vol % (99 vol % commercial) to 25 vol % (75% commercial) of the fluorinated amine. Due to the high viscosity of all components and the limited time for mixing, volumes were measured using measuring spoons. For example, for a 25% fluorinated mixture, 2 teaspoons of epoxy was mixed with ¾ teaspoon commercial curing agent and ¼ teaspoon fluorinated amine. In preferred embodiments, different fluorinated amines (Fluorochem USA, Oakwood Products, Inc., West Columbia, S.C. 29172) were utilized, for example: 2-fluoroaniline (CAS 348-54-9, cat# 001430); 3-fluoroaniline (CAS 372-19-0, cat# 001438); 4-fluoroaniline (CAS 371-40-4, cat# 001439); 3,5-difluoroaniline (CAS 372-39-4, cat# 001690); 3,4-difluoroaniline (CAS 3863-11-4, cat# 001459); 2,6-difluoroaniline (CAS 5509-65-9, cat# 001458), 3-aminobenzotrifluoride (CAS 98-16-8, cat# 001602); 3,5-bis(trifluoromethyl)aniline (CAS 328-74-5, cat#004997).

Figure 4:
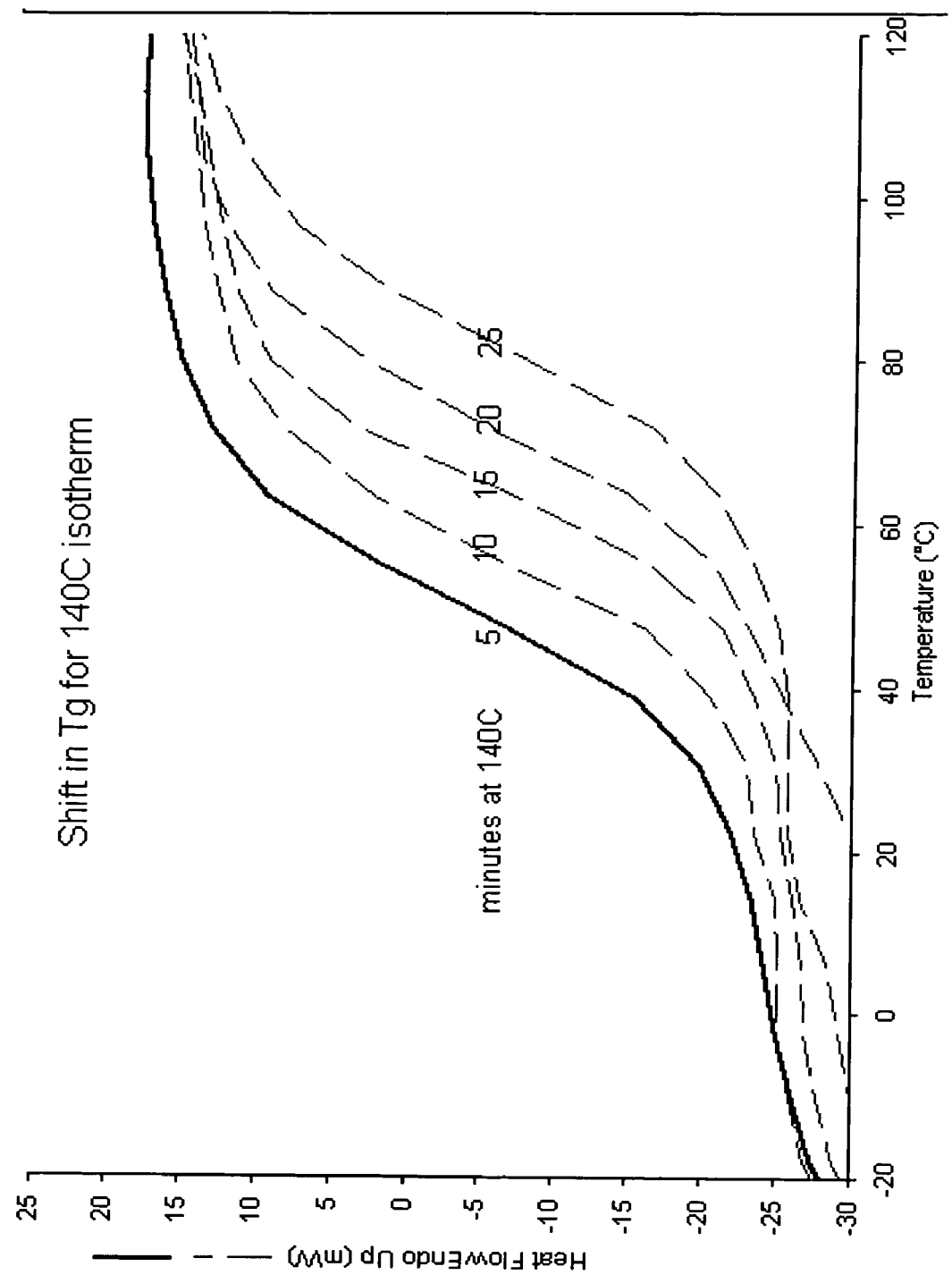
FIG. 4 shows a series of Tg's for DGEBA at 140° C. at various times generated with a single sample on a single high speed DSC program.

Glass Transition Temperature Shift. The glass transition temperature shift as a function of time and temperature for both the commercial epoxy and amine system, as well as for the fluorinated amine mixture was determined by DSC. The series of glass transition temperatures at various curing times is shown in FIG. 4.

Figure 5:
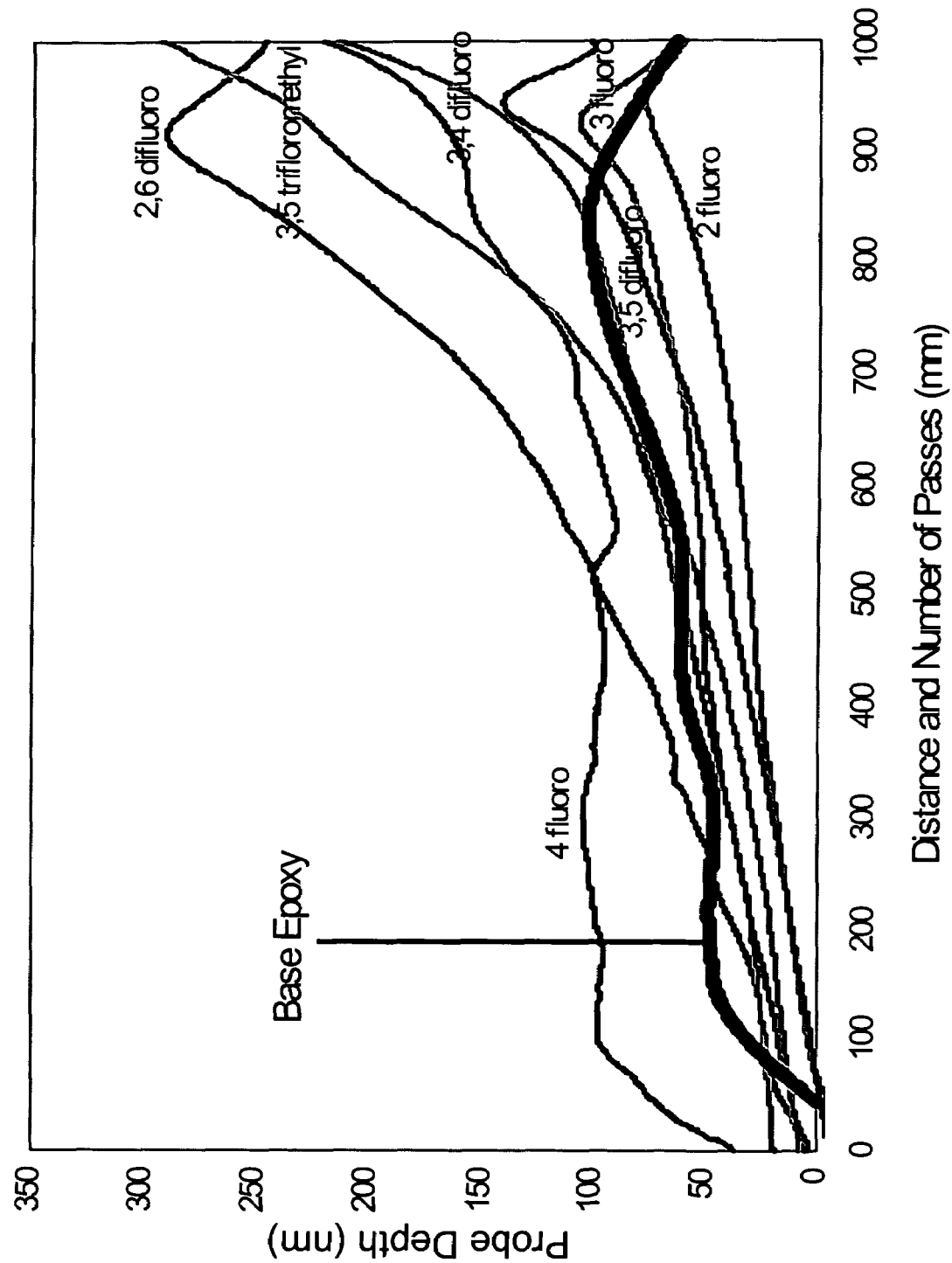
FIG. 5 shows the results of tribological wear testing for various fluorinated amines; the probe depth as a function of distance across the 100 mm test area (0-100 mm is first pass, 101-200 is second pass on same area) is shown for each compound.

Tribology. The eight fluoroanilines described in above were used in conjunction with the aliphatic amine to cure the DGEBA epoxy and were evaluated for wear resistance and physical properties, as well as verification of cure state. The results of wear testing, shown in FIG. 5, imply that the formulations with 2- and 3-fluoroamine and 3,5 difluoroaniline reduce the wear rate of the epoxy, namely the depth of the probe as a function of the number of passes was less than that of the unmodified epoxy.

Figure 6:
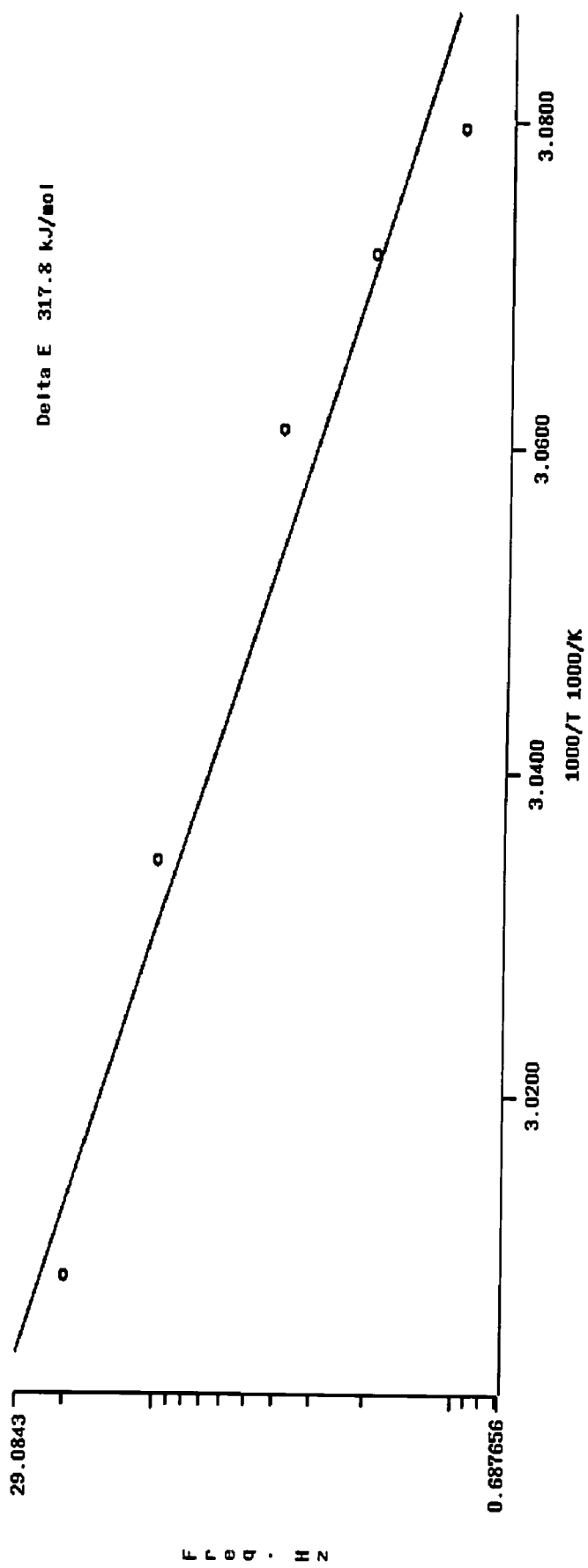
FIG. 6 shows a DMA frequency scan of unmodified epoxy showing storage and loss moduli for various frequencies, as well as the corresponding tan $\delta$s.
Figure 7:
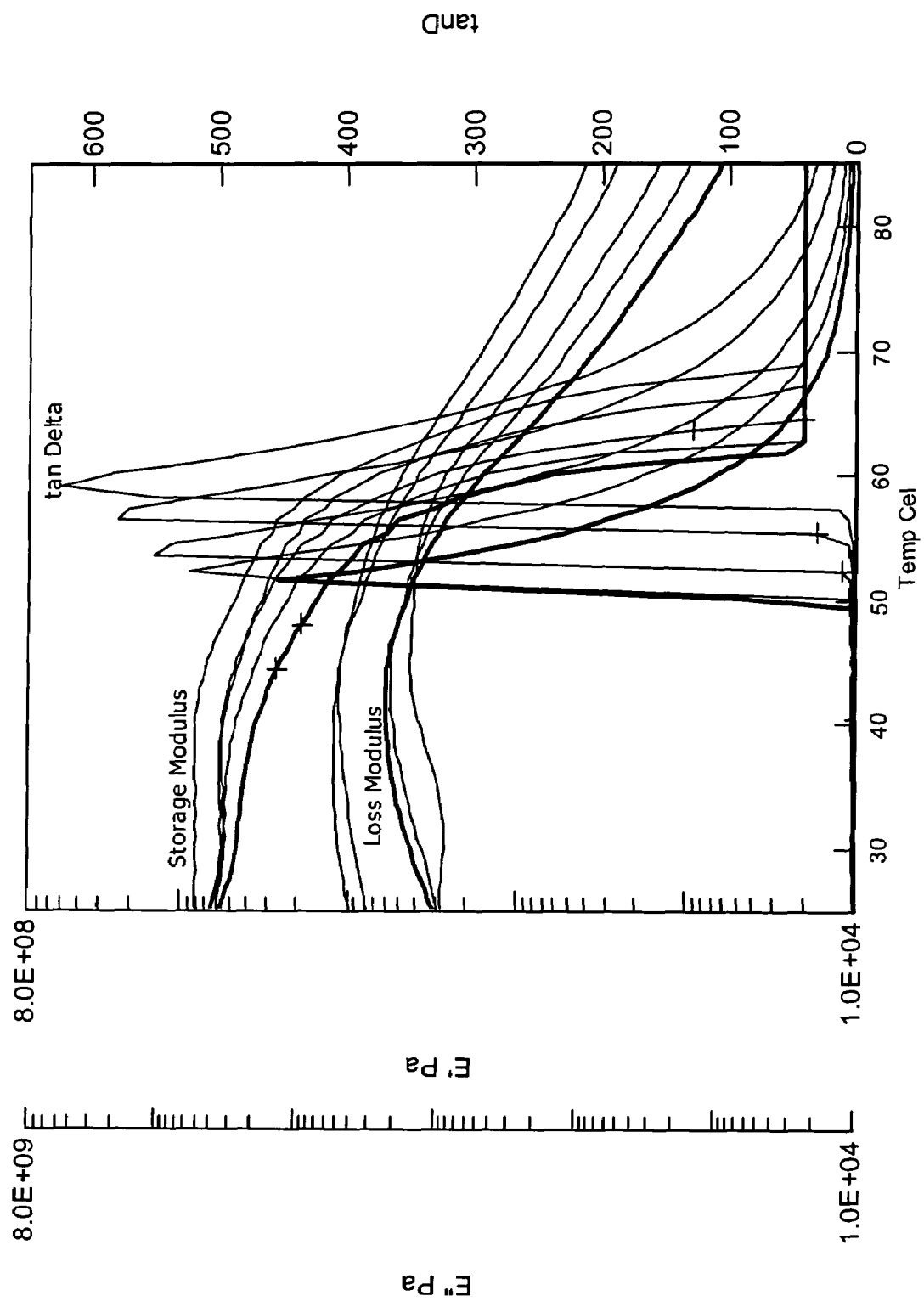
FIG. 7 shows activation energy of unmodified epoxy calculated from frequency dependence of tan $\delta$.

Since physical properties unrelated to the presence of fluorine groups, such as degree of cure and hardness, may also affect the wear properties, the storage moduli and frequency dependence of the tan δs of the formulations were measured and activation energies calculated to compare to the unmodified cured epoxy. The storage modulus of the unmodified epoxy at 1 Hz is 4.7E7 Pa, with the peak in tan δ occurring at 52° C., as shown in FIG. 6. The corresponding frequency dependent activation energy is 317.8 kJ/mol, as shown in FIG. 7.

Figure 8:
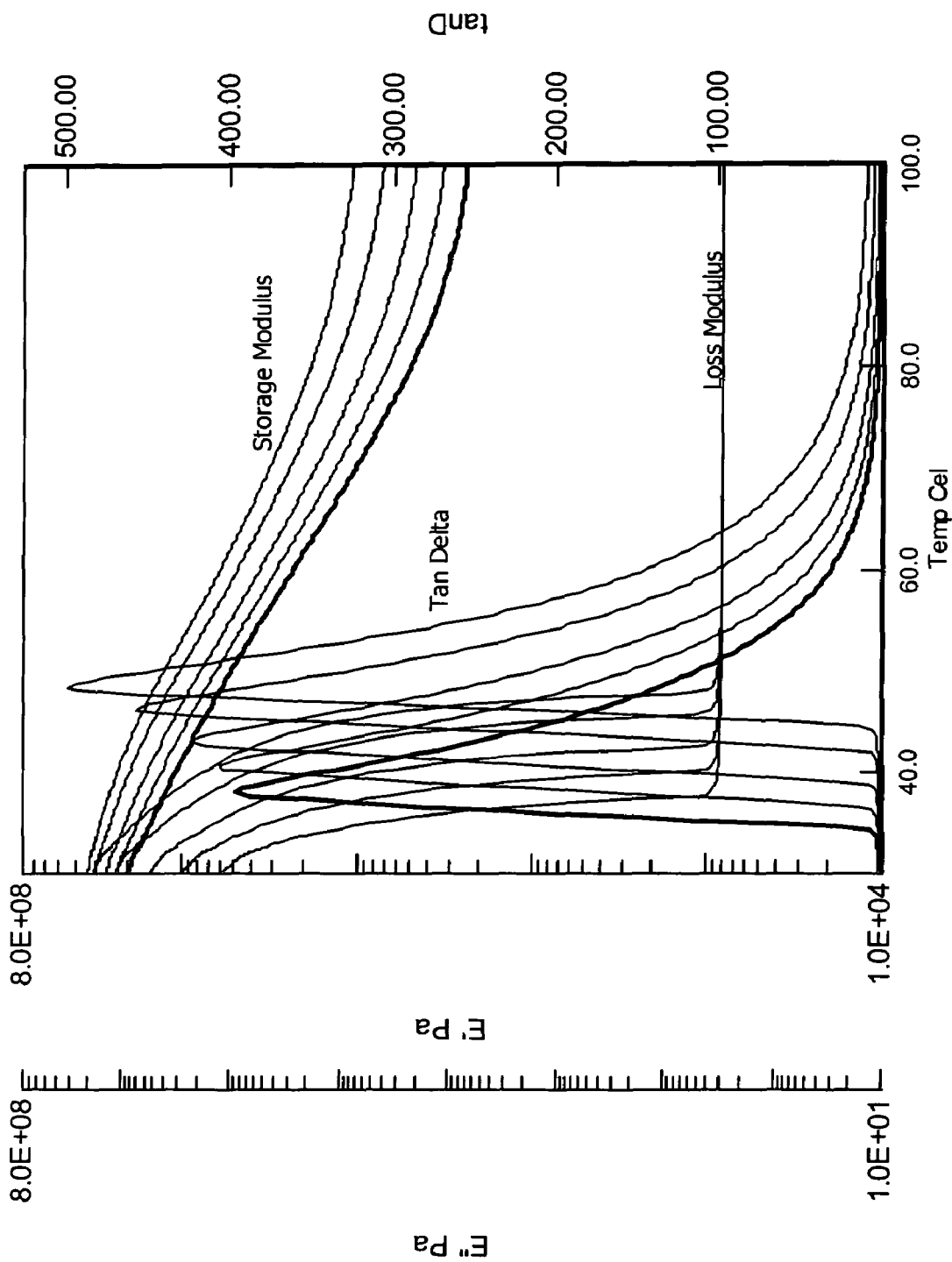
FIG. 8 shows DMA frequency scan of 2-fluoroaniline-cured epoxy showing storage and loss moduli for various frequencies, as well as the corresponding tan $\delta$s.
Figure 9:
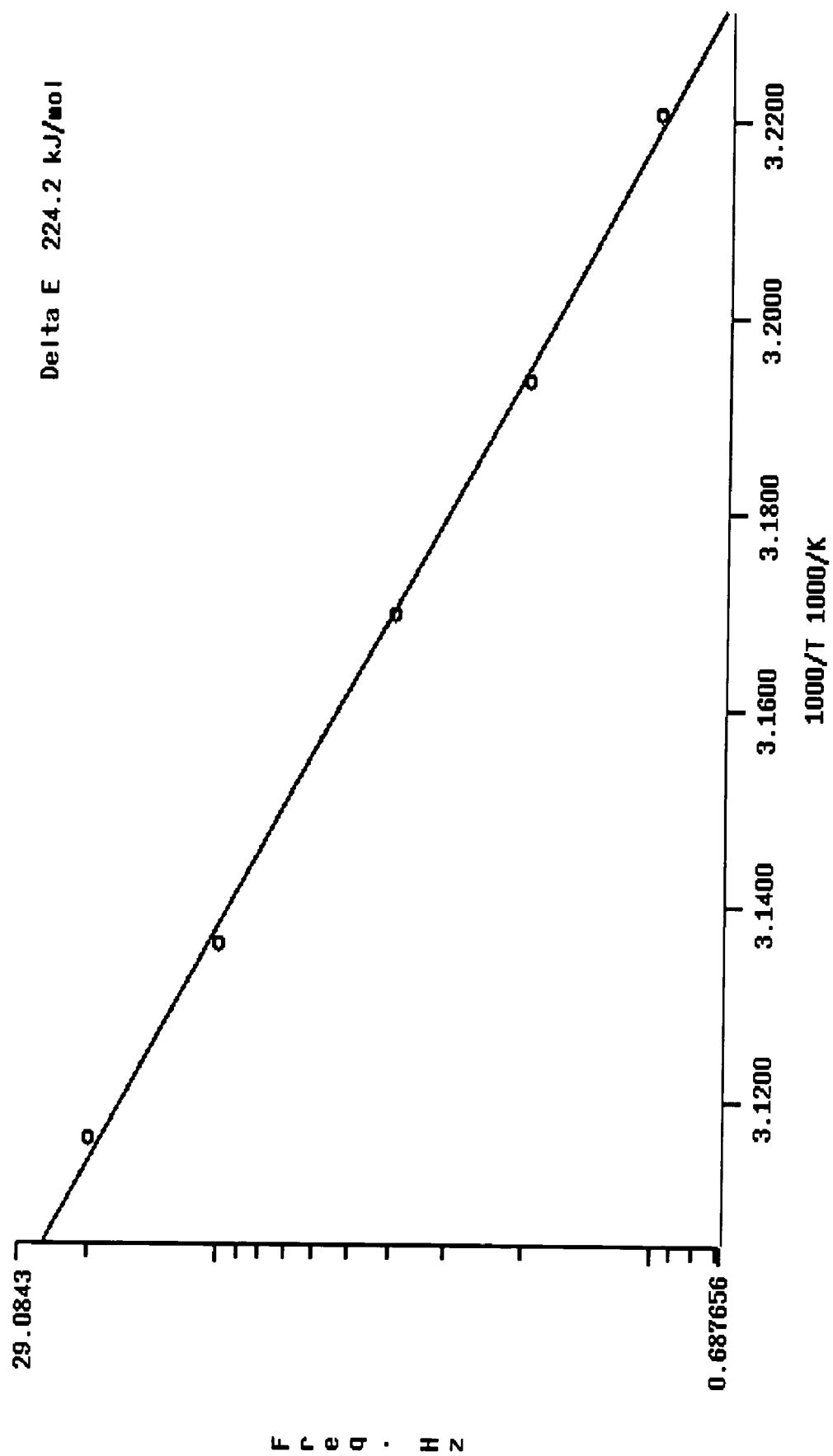
FIG. 9 shows activation energy of 2-fluoroaniline-cured epoxy calculated from frequency dependence of tan $\delta$.

The storage modulus of the 2-fluoroaniline-cured epoxy at 1 Hz is 8.0E7 Pa, with the peak in tan δ occurring at 38° C., as shown in FIG. 8. The corresponding frequency dependent activation energy is 224.2 kJ/mol, as shown in FIG. 9.

Figure 10:
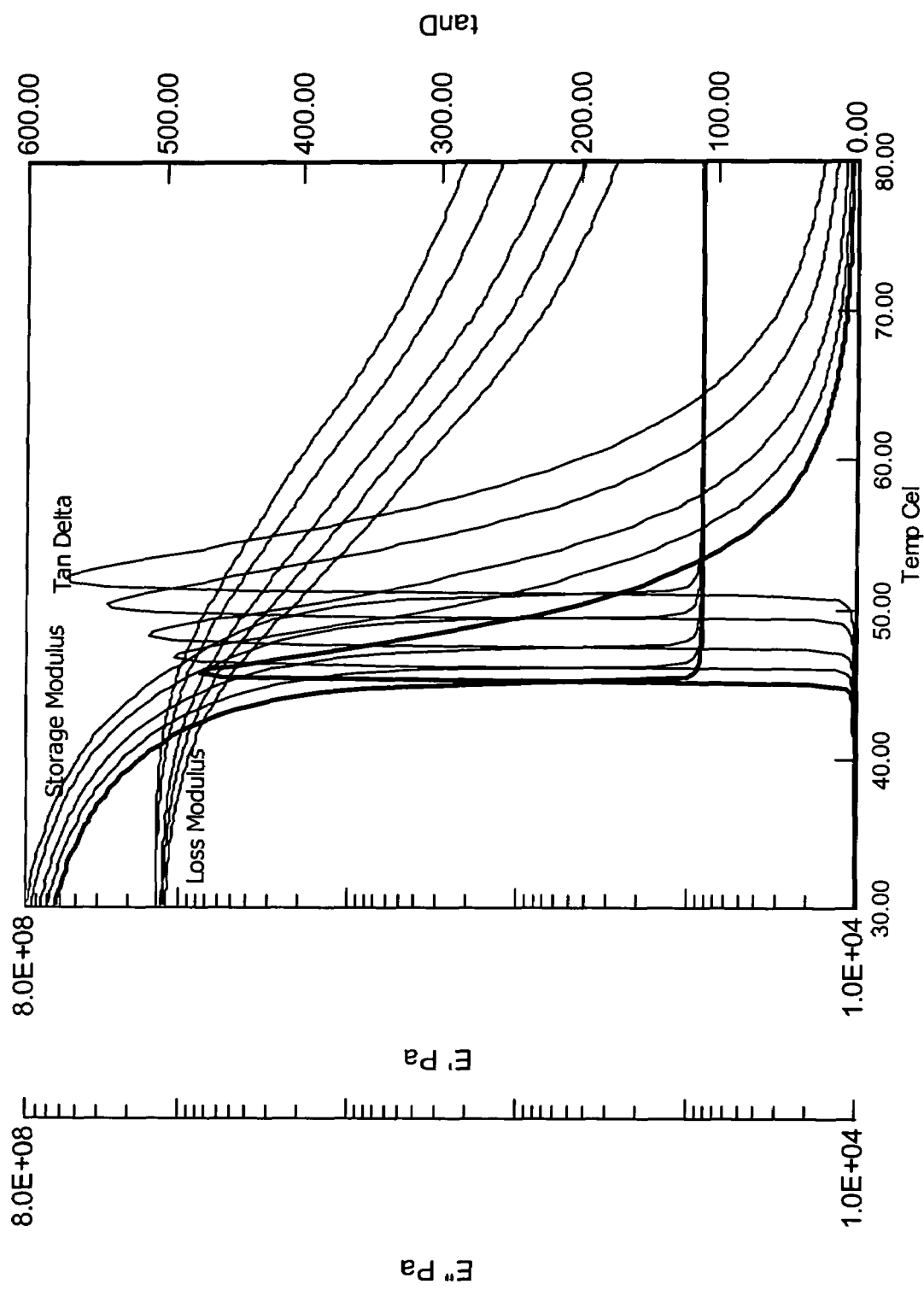
FIG. 10 shows the DMA frequency scan of 3-fluoroaniline-cured expoxy storage and loss moduli for various frequencies, as well as the corresponding tan $\delta$s.
Figure 11:
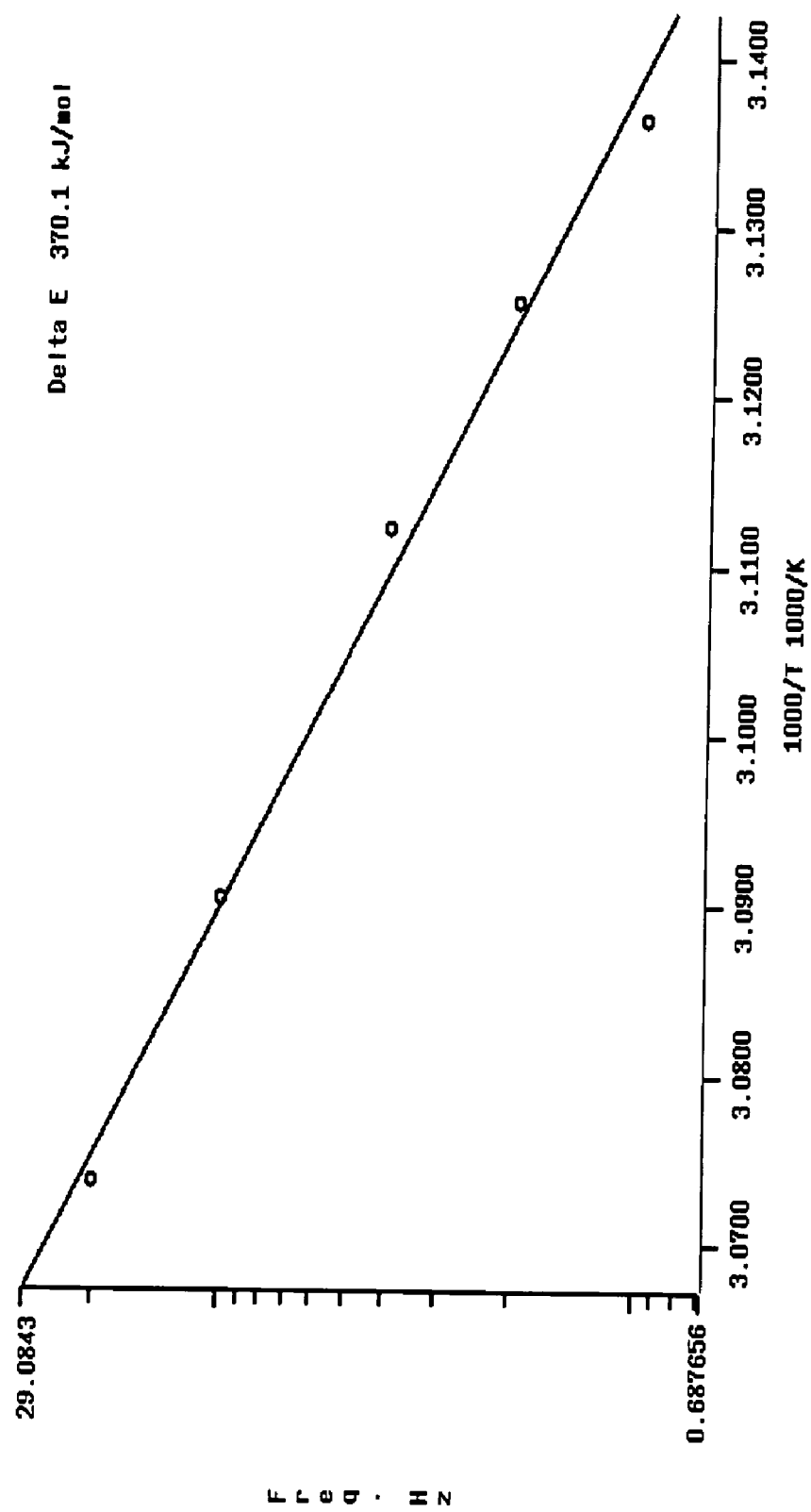
FIG. 11 shows activation energy of 3-fluoroaniline-cured epoxy calculated from frequency dependence of tan $\delta$.

The storage modulus of the 3-fluoroaniline-cured epoxy at 1 Hz is 5.0E8 Pa, with the peak in tan δ occurring at 46° C., as shown in FIG. 10. The corresponding frequency dependent activation energy is 370.1 kJ/mol, as shown in FIG. 11.

Figure 12:
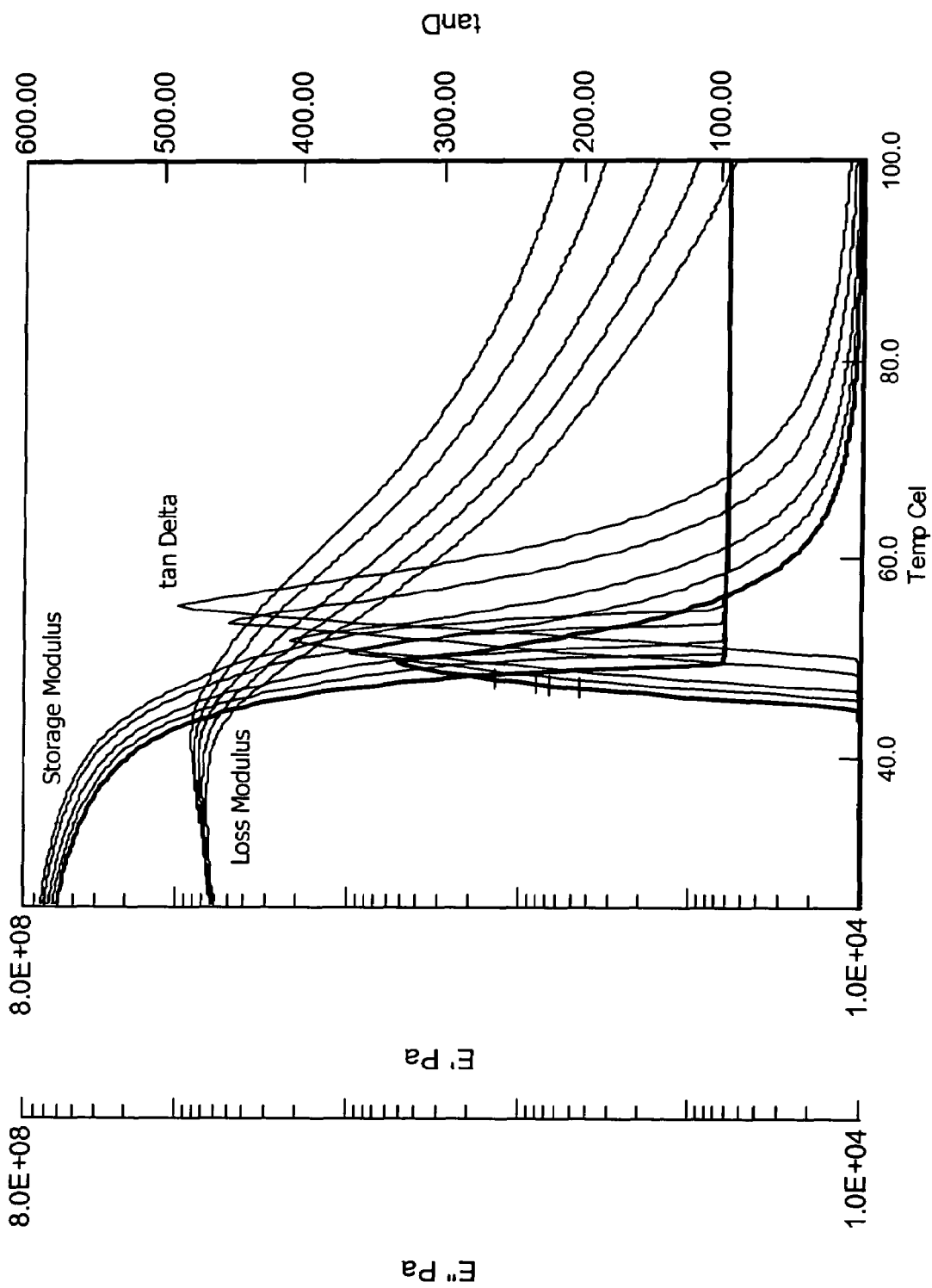
FIG. 12 shows DMA frequency scan of 3,5 difluoroaniline-cured epoxy showing storage and loss moduli for various frequencies, as well as the corresponding tan $\delta$s.
Figure 13:
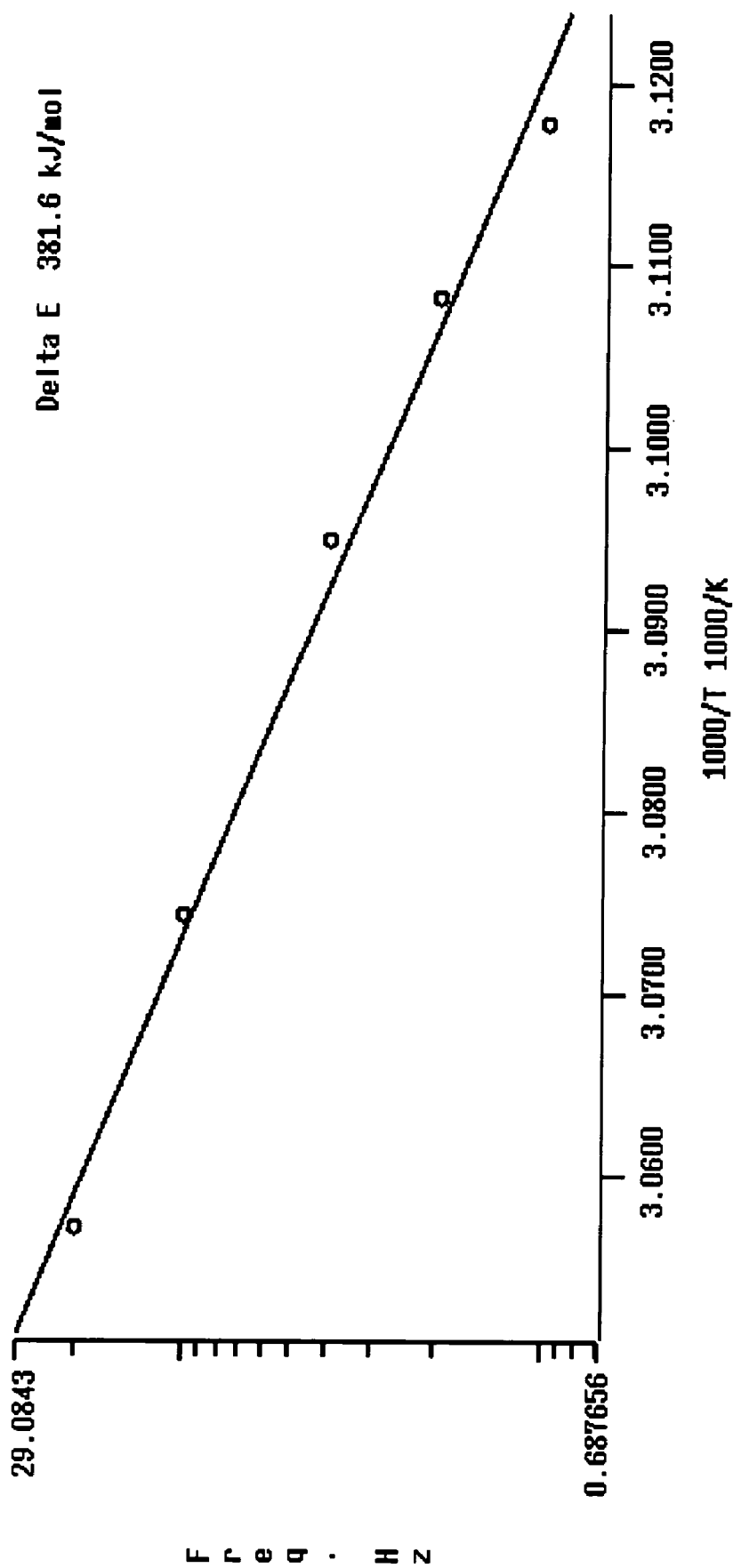
FIG. 13 shows activation energy of 3,5 difluoroaniline-cured epoxy calculated from frequency dependence of tan $\delta$.

The storage modulus of the 3,5 difluoroaniline-cured epoxy at 1 Hz is 6.0E8 Pa, with the peak in tan δ occurring at 48° C., as shown in FIG. 12. The corresponding frequency dependent activation energy is 381.6 kJ/mol, as shown in FIG. 13.

In the three formulations, the storage moduli increased, the $T_g$s indicated by peak in tan δ decreased and the activation energies of the transitions changed. The storage modulus for the 2-fluoroaniline formulation increased by a small amount, while the other two increased by an order of magnitude. This is expected, since the incorporation of aromatic rings will make the network more rigid. The decrease in $T_g$s and lower activation energies are likely due to the lower amine functionality, resulting in lower degree of crosslinking.

Fluorinated compounds tend to phase separate in mixtures, many times migrating to the surface of the mixture due to Gibbs function considerations. This can be advantageous in the case of self-stratifying coatings, i.e. a small amount of fluorinated compound migrates to the surface of the bulk compound to form a coating. However, it can be a disadvantage if the goal of fluorination is to modify bulk properties, as in attempts to increase bulk electrical resistance or dielectric strength. The fluorinated aniline-cured epoxy systems were all tested by infrared scans across a cross sectional sample to test for phase separation. The distribution of fluorine groups was determined to be equivalent across the entire cross section, which means that there was no phase separation or migration of the fluorine functional groups. The most likely explanation for the lack of phase separation is that the viscosity increases and the network forms faster than the fluorinated anilines can migrate. Also, since the fluoroanilines are aromatic amines, with a highly electronegative fluorine group, the amine group will be much more reactive than the non-fluorinated aliphatic amine. The fluoroaniline should react quickly with the epoxy monomers, thus rapidly increase in molecular weight and quickly bond to the growing network through crosslinking.

Example 2

DGEBF epoxy. In a second preferred embodiment both control epoxies and a fluorine-containing epoxies can be formed in order to compare specific properties of the cured resins. The epoxy resin should be a general purpose Bisphenol F type resin that is nonvolatile and are appropriate for cold or heat cured systems. The example of unmodified liquid epoxy resins of Bisphenol F is for the purpose of illustration only and not to be construed as limiting the invention.

The base compound or ingredient of the control composition is an epoxy resin, such as Dow D.E.R. 354, manufactured by Dow Chemical Company, Midland, Mich. The non-fluorine-containing compositions should contain about 2 parts of the epoxy resin Dow D.E.R. 354 and about 1 part aliphatic amine curing agent by volume, and the aliphatic amine curing agent is $H_2N-[CH_2]_n-NH_2$, wherein n is an integer having in a value of at least 1. However, other aliphatic amine curing agents could be utilized for example: polymethylene diamine; $H_2N-[-(CH_2)_n NH-]_{n''}-(CH_2)_{n'''}-NH_2$ polyamine; aniline, phenylamine, or 4,4'-diaminodiphenylsulfone, wherein n', n'', n''' are the same or different and are integers of at least 1.

The fluorine-containing compositions can substitute a fluorinated amine for part of the amine curing agent so that the total volume of commercial amine curing agent+fluorinated amine together is about the same as the volume of the commercial agent alone which satisfied the approximate 2:1 volume ratio. The ratios can be varied from 1 vol % (99 vol % commercial) to 25 vol % (75% commercial) of the fluorinated amine. Due to the high viscosity of all components and the limited time for mixing, volumes can be measured using measuring spoons. For example, to do a 25% fluorinated mixture, 2 teaspoons of epoxy can be mixed with ¾ teaspoon commercial curing agent and ¼ teaspoon fluorinated amine. In preferred embodiments, different fluorinated amines (Fluorochem USA, Oakwood Products, Inc., West Columbia, S.C. 29172) can be utilized, for example: 2-fluoroaniline (CAS 348-54-9, cat# 001430); 3-fluoroaniline (CAS 372-19-0, cat# 001438); 4-fluoroaniline (CAS 371-40-4, cat# 001439); 3,5-difluoroaniline (CAS 372-39-4, cat# 001690); 3,4-difluoroaniline (CAS 3863-11-4, cat# 001459); 2,6-difluoroaniline (CAS 5509-65-9, cat# 001458), 3-aminobenzotrifluoride (CAS 98-16-8, cat# 001602); 3,5-bis(trifluoromethyl)aniline (CAS 328-74-5, cat#004997) or a combination thereof.

Example 3

Novalac Epoxy. In a third preferred embodiment both control epoxies and a fluorine-containing epoxies can be formed in order to compare specific properties of the cured resins. The epoxy resin should be a general purpose Novalac Epoxy type resin that is appropriate for cold or heat cured systems. The example of unmodified liquid epoxy resins of Novalac Epoxy is for the purpose of illustration only and not to be construed as limiting the invention.

The base compound or ingredient of the control composition is an epoxy resin, such as Dow D.E.N. 425 or 431, manufactured by Dow Chemical Company, Midland, Mich. The non-fluorine-containing compositions should contain about 2 parts of the epoxy resin Dow D.E.N. 425 or 431 and about 1 part aliphatic amine curing agent by volume, and the aliphatic amine curing agent is $H_2N-[CH_2]_n-NH_2$, wherein n is an integer having in a value of at least 1. However, other aliphatic amine curing agents could be utilized for example: polymethylene diamine; $H_2N-[-(CH_2)_{n'}-NH-]_{n''}-(CH_2)_{n'''}-NH_2$ polyamine; aniline, phenylamine, or 4,4'-diaminodiphenylsulfone, wherein n', n'', n''' are the same or different and are integers of at least 1.

The fluorine-containing compositions can substitute a fluorinated amine for part of the amine curing agent so that the total volume of commercial amine curing agent+fluorinated amine together is about the same as the volume of the commercial agent alone which satisfied the approximate 2:1 volume ratio. The ratios can be varied from 1 vol % (99 vol % commercial) to 25 vol % (75% commercial) of the fluorinated amine. Due to the high viscosity of all components and the limited time for mixing, volumes can be measured using measuring spoons. For example, to do a 25% fluorinated mixture, 2 teaspoons of epoxy can be mixed with ¾ teaspoon commercial curing agent and ¼ teaspoon fluorinated amine. In preferred embodiments, different fluorinated amines (Fluorochem USA, Oakwood Products, Inc., West Columbia, S.C. 29172) can be utilized, for example: 2-fluoroaniline (CAS 348-54-9, cat# 001430); 3-fluoroaniline (CAS 372-19-0, cat# 001438); 4-fluoroaniline (CAS 371-40-4, cat# 001439); 3,5-difluoroaniline (CAS 372-39-4, cat# 001690); 3,4-difluoroaniline (CAS 3863-11-4, cat# 001459); 2,6-difluoroaniline (CAS 5509-65-9, cat# 001458), 3-aminobenzotrifluoride (CAS 98-16-8, cat# 001602); 3,5-bis(trifluoromethyl)aniline (CAS 328-74-5, cat#004997) or a combination thereof.

Example 4

Glycol Epoxy. In a fourth preferred embodiment both control epoxies and a fluorine-containing epoxies can be formed in order to compare specific properties of the cured resins. These examples of unmodified liquid epoxy resins would be based on Glycol Epoxy.

The base compound or ingredient of the control composition is an epoxy resin, such as Dow D.E.R. 732 or 736, manufactured by Dow Chemical Company, Midland, Mich. The non-fluorine-containing compositions should contain about 2 parts of the epoxy resin Dow D.E.R. 732 or 736 and about 1 part aliphatic amine curing agent by volume, and the aliphatic amine curing agent is $H_2N-[CH_2]_n-NH_2$, wherein n is an integer having in a value of at least 1. However, other aliphatic amine curing agents could be utilized for example: polymethylene diamine; $H_2N-[-(CH_2)_{n'}-NH-]_{n''}-(CH_2)_{n'''}-NH_2$ polyamine; aniline, phenylamine, or 4,4'-diaminodiphenylsulfone, wherein n', n'', n''' are the same or different and are integers of at least 1.

The fluorine-containing compositions can substitute a fluorinated amine for part of the amine curing agent so that the total volume of commercial amine curing agent+fluorinated amine together is about the same as the volume of the commercial agent alone which satisfied the approximate 2:1 volume ratio. The ratios can be varied from 1 vol % (99 vol % commercial) to 25 vol % (75% commercial) of the fluorinated amine. Due to the high viscosity of all components and the limited time for mixing, volumes can be measured using measuring spoons. For example, to do a 25% fluorinated mixture, 2 teaspoons of epoxy can be mixed with ¾ teaspoon commercial curing agent and ¼ teaspoon fluorinated amine. In preferred embodiments, different fluorinated amines (Fluorochem USA, Oakwood Products, Inc., West Columbia, S.C. 29172) can be utilized, for example: 2-fluoroaniline (CAS 348-54-9, cat# 001430); 3-fluoroaniline (CAS 372-19-0, cat# 001438); 4-fluoroaniline (CAS 371-40-4, cat# 001439); 3,5-difluoroaniline (CAS 372-39-4, cat# 001690); 3,4-difluoroaniline (CAS 3863-11-4, cat# 001459); 2,6-difluoroaniline (CAS 5509-65-9, cat# 001458), 3-aminobenzotrifluoride (CAS 98-16-8, cat# 001602); 3,5-bis(trifluoromethyl)aniline (CAS 328-74-5, cat#004997) or a combination thereof.

Example 5

Halogen Containing Epoxies. In a fifth preferred embodiment both control epoxies and a halogen-containing epoxies can be formed in order to compare specific properties of the cured resins. Examples of unmodified liquid epoxy resins would be based on Glycol Epoxy, Novalac Epoxy, DGEBF epoxy, or DGEBA epoxy.

The base compound or ingredient of the control composition is an epoxy resin. The non-halogen-containing compositions should contain about 2 parts of the epoxy resin and about 1 part aliphatic amine curing agent by volume, and a specific aliphatic amine curing agent is $H_2N-[CH_2]_n-NH_2$, wherein n is an integer having in a value of at least 1. However, other aliphatic amine curing agents could be utilized for example: polymethylene diamine; $H_2N-[-(CH_2)_{n'}-NH-]_{n''}-(CH_2)_{n'''}-NH_2$ polyamine; aniline, phenylamine, or 4,4'-diaminodiphenylsulfone, wherein n', n'', n''' are the same or different and are integers of at least 1.

The halogen-containing compositions can substitute a halogen containing amine for part of the amine curing agent so that the total volume of commercial amine curing agent+halogen containing amine together is about the same as the volume of the commercial agent alone which satisfied the approximate 2:1 volume ratio. The ratios can be varied from 1 vol % (99 vol % commercial) to 25 vol % (75% commercial)

of the halogen containing amine. Due to the high viscosity of all components and the limited time for mixing, volumes can be measured using measuring spoons. For example, to do a 25% halogenated mixture, 2 teaspoons of epoxy can be mixed with ¾ teaspoon commercial curing agent and ¼ teaspoon halogen containing amine. In preferred embodiments, different halogenated amines are available from Sigma-Aldrich (St. Louis Mo.), for example: 2,6-dibromo-3,5-bis(trifluoromethyl)-aniline #S649104 CAS:133861-33-3; 2,6-dibromo-4-(trifluoromethoxy)-aniline #563153 CAS:88149-49-9; 2,6-dibromo-4-(trifluoromethyl)-aniline #559970 CAS:72678-19-4; 2-bromo-4-(trifluoromethoxy)-aniline #457388 CAS:175278-17-8; 2-bromo-4-(trifluoromethyl)-aniline #518700 CAS:57946-63-1; 2-bromo-5-(trifluoromethyl)-aniline #217867 CAS:454-79-5; 2,6-dichloro-4-(trifluoromethoxy)-aniline #429899 CAS:99479-66-0; 2,6-dichloro-4-(trifluoromethyl)-aniline #408190 CAS:24279-39-8; 2-chloro-4-(trifluoromethyl)-aniline #578568 CAS: 39885-50-2; 2-chloro-4-(methylsulfonyl)-aniline #S448281 CAS:13244-35-4.

REFERENCES CITED

The following references, to the extent that they provide exemplary procedural or other details supplementary to those set forth herein, are specifically incorporated herein by reference.

Patent Documents

U.S. Pat. No. 2,456,408, issued to Greenlee, S., on Dec. 14, 1948, and titled "Synthetic Drying Compositions."
Switzerland Patent No.: CH 211,116, issued to De Trey, on Nov. 18, 1940 and titled "Verfahren zur Herstellung eines Hartbaren Kunstharzes."
Great Britain Patent No.: GB 518057 issued to De Trey Freres S. A., on Feb. 15, 1940, and titled A process for the Manufacture of Thermo-setting Synthetic Resins by the Condensation of Alkylene Oxides with Anhydrides of Polybasic Acids."
German Patent No.: DRP 749,512 (1938).

REFERENCES:

BILYEU, B. Characterization of Cure Kinetics and Physical Properties of a High Performance Glass Fiber-Reinforced Epoxy Prepreg and a Novel Fluorine-Modified, Amine-Cured Commercial Epoxy, Ph.D. dissertation, University of North Texas (2003).
BROSTOW, W., P. E. Cassidy, H. E. Hagg, M. Jaklewicz and P. E. Montemartini, "Fluoropolymer Addition to an Epoxy: Phase Inversion and Tribological Properties", Polymer 42, 2001, 7971.
BROSTOW, W., B. Bujard, P. Cassidy, H. Hagg and P. E. Montemartini, Mat. Res. Innov., 6, 7, (2002).
CHAMBON, F., Petrovic Z S, MacKnight W J, Winter H H Rheology of Model Polyurethanes at the Gel Point. Macromolecules 19:2146-2149, (1986)
CHAMBON, F., and Winter H H Linear Viscoelasticity at the Gel Point of a Crosslinking PDMS with Imbalanced Stoichiometry. J Rheol 31:683-697, (1987)
CASSETTARI, M., G. Salvetti, E. Tombari, S. Veronesi, and G. P. Johari: "Calorimetric Determination of Vitrification Time and Heat Capacity of a Thermosetting Polymer". J. Polym. Sci.: Part B: Polym. Phys. 31, 199-208, (1993).
DOW PLASTICS, Product Information D.E.R. 330 Liquid Epoxy Resin, Dow Chemical Company, Midland, Mich., Publication Form No. 296-01457-1001XSI.
DOW PLASTICS, Product Information D.E.R. 332 Liquid Epoxy Resin, Dow Chemical Company, Midland, Mich., Publication Form No. 296-01447-1001XSI.
DOW PLASTICS, Product Information D.E.N. 425 Liquid Epoxy Resin, Dow Chemical Company, Midland, Mich., Publication Form No. 296-01649-0404-TD
DOW PLASTICS, Product Information D.E.N. 431 Liquid Epoxy Resin, Dow Chemical Company, Midland, Mich., Publication Form No. 296-01442-1203-TD
DOW PLASTICS, Product Information D.E.R. 732 Liquid Epoxy Resin, Dow Chemical Company, Midland, Mich., Publication Form No. 296-01474-1001XSI.
DOW PLASTICS, Product Information D.E.R. 736 Liquid Epoxy Resin, Dow Chemical Company, Midland, Mich., Publication Form No. 296-01507-1001XSI.
GILLHAM, J. K. AIChE J., 20 (1974) 1066.
GRIFFITH, J. R. and J. B. Romans, J. Fluorine Chem., 34 (1987) 361.
HADAD, D. K. and C. A. May, Engineered Materials Handbook, Vol. 2, Engineering Plastics, Sec. 5, Ed. C. A. Dostal, ASM International, Metals Park, Ohio (1988) 521.
HATAKEYAMA, T. and H. Hatakeyama, Thermochim. Acta, 267 (1995) 249.
MATUSZCZAK, S. and W. J. Feast, J. Fluorine Chem., 102 (2000) 269.
O'NEILL, M. J., Anal. Chem., 36 (1964) 1238.
WATSON, E. S., M. J. O'Neill, J. Justin and N. Brenner, Anal. Chem., 36 (1964) 1233.
WINTER, H. H. and Chambon F Analysis of Linear Viscoelasticity of a Crosslinking Polymer at the Gel Point. J Rheology 30:367-382 (1986)

What is claimed:

1. A halogen containing cured or self cured epoxy composition comprising:
    (a) an epoxy resin;
    (b) an aliphatic amine curing agent; and
    (c) a bromine containing amine; or an iodine containing amine;
    wherein a pre-cured volume ratio is about 2 parts of (a) to about 1 part of a combined volume of: (b) and (c); and wherein (c) comprises from about 1% to about 25% of the combined volume of (b) and (c).

2. The composition of claim 1, further comprising (d) of a reinforcement fiber of glass, carbon fiber, ceramic fiber, or polymeric fibers.

3. A method of making a halogen containing epoxy composition comprising:
    mixing about 2 parts of an epoxy resin with about 1 part of a combined mixed volume of an aliphatic amine curing agent and a halogenated amine,
    wherein, the halogenated amine comprises: a bromine containing amine; or an iodine containing amine; and
    wherein the halogenated amine comprises from about 1% to about 25% volume of the combined mixed volume of the aliphatic amine curing agent and the halogenated amine.

4. The method of claim 3, further comprising step (e) of adding a reinforcement fiber of glass, carbon fiber, ceramic fiber, or polymeric fiber to the halogen containing epoxy composition forming a reinforced halogen containing epoxy composition.

* * * * *